United States Patent
Mao

(10) Patent No.: US 8,600,347 B2
(45) Date of Patent: Dec. 3, 2013

(54) IDLE MODE NOTIFICATION

(75) Inventor: Ronald Mao, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1442 days.

(21) Appl. No.: 11/677,352

(22) Filed: Feb. 21, 2007

(65) Prior Publication Data

US 2008/0070603 A1    Mar. 20, 2008

Related U.S. Application Data

(60) Provisional application No. 60/825,667, filed on Sep. 14, 2006.

(51) Int. Cl.
*H04M 11/00* (2006.01)
*H04M 3/42* (2006.01)
*H04W 4/00* (2009.01)

(52) U.S. Cl.
USPC ........ 455/406; 455/407; 455/408; 455/414.1; 455/435.1; 455/435.2

(58) Field of Classification Search
USPC .......................... 455/405, 406, 456, 411, 461
See application file for complete search history.

(56) References Cited

U.S. PATENT DOCUMENTS

| | | | |
|---|---|---|---|
| 6,628,194 B1 * | 9/2003 | Hellebust et al. | 340/7.5 |
| 6,970,693 B2 * | 11/2005 | Madour et al. | 455/408 |
| 7,139,827 B1 * | 11/2006 | Iwayama et al. | 709/227 |
| 7,289,792 B1 * | 10/2007 | Turunen | 455/414.1 |
| 7,454,206 B1 * | 11/2008 | Phillips et al. | 455/435.1 |
| 7,720,960 B2 | 5/2010 | Pruss et al. | |
| 2003/0228866 A1 * | 12/2003 | Pezeshki | 455/422.1 |
| 2004/0136340 A1 | 7/2004 | Sanchez et al. | |
| 2004/0193513 A1 * | 9/2004 | Pruss et al. | 705/30 |
| 2004/0224694 A1 * | 11/2004 | Zhao et al. | 455/445 |
| 2006/0014561 A1 | 1/2006 | Morinaga et al. | |
| 2007/0087767 A1 * | 4/2007 | Pareek et al. | 455/502 |

FOREIGN PATENT DOCUMENTS

| | | |
|---|---|---|
| CN | 1510958 A | 7/2004 |
| CN | 1567884 | 1/2005 |
| CN | 1728602 | 2/2006 |
| EP | 1 617 599 A1 | 1/2006 |
| JP | 2004-235954 A | 8/2004 |
| KR | 10 1998 083273 | 12/1998 |

(Continued)

OTHER PUBLICATIONS

PCT International Search Report of PCT/CN2007/070698, form PCT/ISA/210, mailed Dec. 20, 2007, Applicant: Huawei Technologies Co., Ltd., et al., 6 pages.

(Continued)

*Primary Examiner* — Jean Gelin
*Assistant Examiner* — Dung Hong
(74) *Attorney, Agent, or Firm* — Slater & Matsil, L.L.P.

(57) ABSTRACT

A network component comprising a processor configured to implement a method comprising: detecting a state of a mobile station and sending a state message to a connection service network using an accounting protocol wherein the state message comprises a state data indicating the state of the mobile station is disclosed. Also disclosed is a network component comprising a processor configured to implement a method comprising: receiving a message intended for a mobile station determining whether the mobile station is in an idle state and storing the message until the mobile station exits the idle state.

20 Claims, 5 Drawing Sheets

(56) References Cited

FOREIGN PATENT DOCUMENTS

| | | |
|---|---|---|
| KR | 1020040051260 A | 6/2004 |
| KR | 1020040096332 A | 11/2004 |
| KR | 1020060079516 A | 7/2006 |
| WO | WO 99/61966 | 12/1999 |

OTHER PUBLICATIONS

PCT Written Opinion of the International Searching Authority for PCT/CN2007/070698, form PCT/ISA/237, mailed Dec. 20, 2007, Applicant: Huawei Technologies Co., Ltd., et al., 5 pages.

Chinese office action dated Jun. 11, 2010, Application No. 200780030154.3, 7pages.

* cited by examiner

IDLE MODE NOTIFICATION

CROSS-REFERENCE TO RELATED APPLICATIONS

This application claims priority to U.S. Provisional Application Ser. No. 60/825,667, filed Sep. 14, 2006 and entitled "Idle Mode Notification," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Several types of networks can be involved in the communication of data between users. For example, when the users are using mobile devices, such as notebook computers, the mobile devices communicate with an access network, such as a wireless access point. After the access network verifies the user's account status and identity with a connection service network, the user is free to exchange data with third party networks via the access network and/or the connection service network.

SUMMARY

In a first embodiment, the disclosure includes a network component comprising a processor configured to implement a method comprising detecting a state of a mobile station, and sending a state message to a connection service network using an accounting protocol, wherein the state message comprises a state data indicating the state of the mobile station.

In a second embodiment, the disclosure includes a network component comprising a processor configured to implement a method comprising receiving a message intended for a mobile station, determining whether the mobile station is in an idle state, and storing the message until the mobile station exits the idle state.

In a third embodiment, the disclosure includes an apparatus comprising a first communication component configured to allow a network to communicate with a mobile station, a second communications component configured to communicate with a connection service network, and an accounting module comprising an accounting data associated with the mobile station and a state data associated with the mobile station, wherein the second communications component independently communicates the state data and the accounting data to the connection service network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One problem that occurs in the existing networks is that the connection service network does not know the state of the mobile station. For example, when the mobile station transitions from an active state to an idle state, the connection service network is unaware of such a transition. It would be beneficial if the notification of such a transition could occur with a minimal use of bandwidth and without disrupting other processes. Consequently, a need exists in the art for a method of notifying a connection service network of the state of a mobile station.

Described herein is a method for an access network to notify a connection service network of a mobile station's state changes. When the mobile station initiates a session with an access network, the access network monitors the state of the mobile station and collects accounting data regarding the mobile station's session. When the mobile station undergoes a state change, for example by entering or exiting an idle state, the access network sends a state message to the connection service network using an accounting protocol. The state message includes the state of the mobile station, but does not include the accounting data. When the mobile station's session is terminated, the access network sends an accounting message to the connection service network that includes the accounting data. By only sending a single instance of the accounting data to the connection service network and using the accounting protocol to do so, in some embodiments the access network may reduces the bandwidth usage between the access network and the connection service network and the efficiency of the accounting processes at the connection service network are improved.

Figure 1:
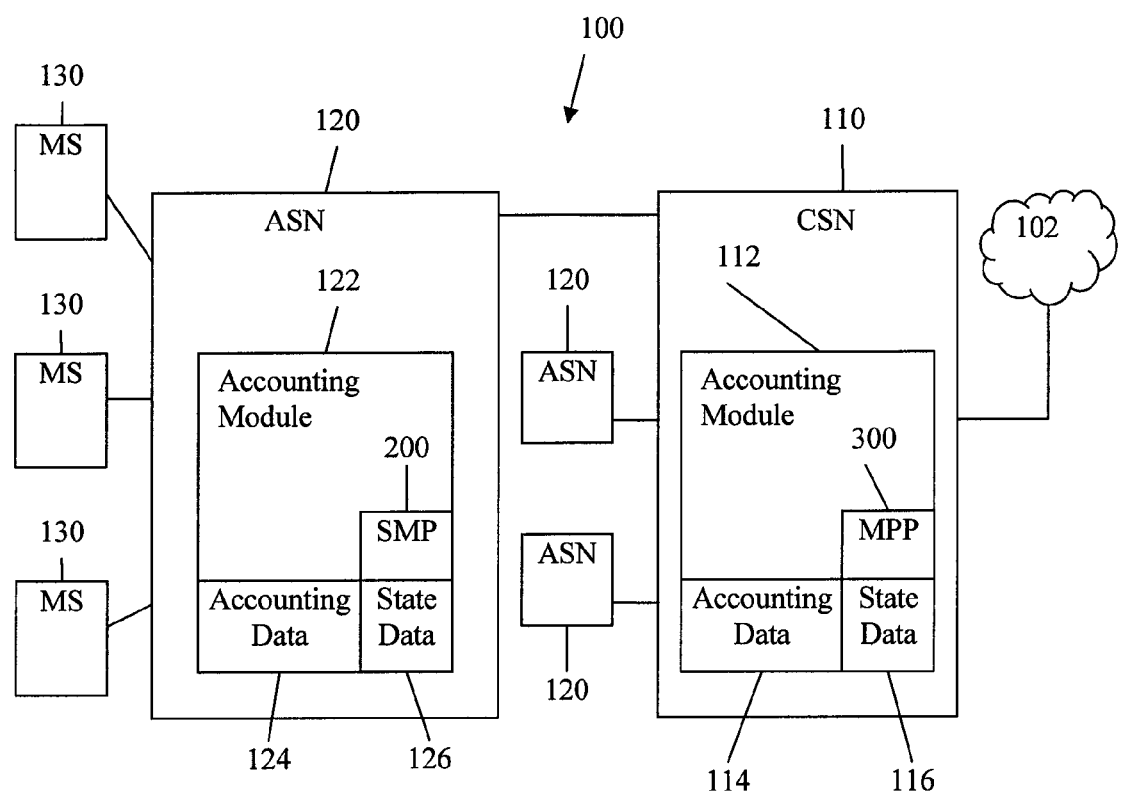
FIG. 1 is one embodiment of a communications network framework.

FIG. 1 displays an embodiment of a system 100 comprised of a plurality of mobile stations (MSs) 130, a plurality of access service networks (ASNs) 120, a connection service network (CSN) 110, and a third party network 102. The ASN 120 may contain an accounting module 122 comprised of accounting data 124, MS state data 126, and a State Monitoring Program 200. Similarly, the CSN 110 may contain an accounting module 112 comprised of accounting data 114, MS state data 116, and a Message Processing Program 300. Each of these components of the system 100 is described in detail below.

The MSs 130 may be any devices that use the ASN 120 to access the CSN 110 and/or the third party network 102. In one embodiment, the MSs 130 are wireless devices that communicate with the ASN 120 via a wireless network. For example, the MSs 130 may be cellular telephones, notebook computers, personal digital assistants (PDAs), or any other wireless devices. Examples of suitable wireless networks include the worldwide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), one of the Institute for Electrical and Electronic Engineers (IEEE) 802 wireless networks, or any other wireless network. In an alternative embodiment, the MSs 130 are devices that communicate with the ASN 120 via a wired network. For example, the MSs 130 may be a notebook computer plugged into a network connection. It should be understood that the system 100 may include any number of MSs 130, and should not be limited to the three MSs 130 displayed in FIG. 1.

In embodiments, the MSs 130 exist in one of various states, such as an active state and an idle state. The active state may be characterized by the exchange of data between a MS 130 and the CSN 110 or the third party network 102. For example, a MS 130 may be in the active state when the user is using the MS 130 to actively upload, download, or otherwise exchange data with the CSN 110 and/or third party network 102 via the ASN 120. Specifically, a user may be browsing the Internet to find a location for a restaurant or downloading a picture from an email received from a friend. In contrast, the idle state may be characterized by the lack of data exchange between a MS 130 and the CSN 110 or the third party network 102. For example, the MS 130 may be in the idle state when the user is not using the MS 130 to actively upload, download, or otherwise exchange data with the CSN 110 and/or the third party network 102. Specifically, the user may have stopped browsing, downloading, or using an email service. The idle state may optionally include those instances where the data exchange is limited to low-priority data, such as operations, administration, and maintenance (OAM) packets, exchanged between the ASN 120 and the MS 130.

The ASN 120 is a network that allows the MSs 130 to communicate with the CSN 110 and/or third party network 102. Specifically, the ASN 120 is a fixed point that provides wireless coverage for the plural MSs 130. The ASN 120 is typically limited to a specific location, such as a single tower, office, or commercial location, but may also be a distributed network of such locations. The ASN 120 may communicate with the MSs 130, the CSN 110, and/or third party network 102 using wireless, wired, and/or optical connections and protocols. For example, the ASN 120 may communicate with the MSs 130 using, for example, Wi-Fi or WiMax, and may communicate with the CSN 110 and/or third party network 102 using a variety of protocols, including Ethernet, Internet Protocol (IP), Asynchronous Transfer Mode (ATM), or any other suitable protocol. It should be understood that the system 100 may include any number of ASNs 120, and should not be limited to the three ASNs 120 displayed in FIG. 1.

One of the components of the ASN 120 is the accounting module 122. The accounting module 122 collects accounting data 124 and state data 126 associated with the MSs 130, and transmits the accounting data 124 and the state data 126 to the CSN 110. The accounting data 124 may include any of a variety of different types of information associated with each MS 130, including the total time that each MS 130 spent logged onto the ASN 120, the amount of data downloaded to each MS 130, the amount of data uploaded from each MS 130, the bandwidth allocated to each MS 130, the bandwidth actually used by each MS 130 for data transfer, the type of data transferred to or from each MS 130, and/or other factors known to persons of ordinary skill in the art. In contrast, the state data 126 may include data related to the state of each MS 130, such as the total time that each MS 130 spent in the active state, the total time that each MS 130 spent in the idle state, a detailed record of when each MS 130 changed states, and/or other factors known to persons of ordinary skill in the art. In an embodiment, the accounting data and/or the state data sent to the CSN 120 contain less than all of the accounting data 124 and the state data 126 collected by the ASN 120. In addition, the ASN 120 may be connected to a plurality of CSNs 120. As such, the ASN 120 may send different accounting data and/or state data to different CSNs 110. To assist with the collection and transmission of the accounting data 124 and the state data 126 to the CSN 110, the accounting module 122 may comprise of a State Monitoring Program (SMP) 200, which is discussed in detail below.

The CSN 110 is a network that accounts for the resources that the MSs 130 use. Specifically, the CSN 110 is a network that collects the accounting data from a plurality of ASNs 120, organizes the accounting data, and bills the MS users. The ASN 120 is typically limited to a specific location, such as a single server, office, or commercial location, but may also be a distributed network of such locations. The CSN 110 may communicate with the ASN 120 and/or third party network 102 using wireless, wired, and/or optical connections and protocols. For example, the ASN 120 may communicate with the ASN 120 and/or third party network 102 using a variety of protocols, including Ethernet, Internet Protocol (IP), Asynchronous Transfer Mode (ATM), or any other suitable protocol. It should be understood that the system 100 may include any number of CSNs 110, and should not be limited to the one CSN 110 displayed in FIG. 1.

One of the components of the CSN 110 is the accounting module 112. In an embodiment, the accounting module 112 uses the accounting data 114 received from the ASN 120 to bill the user for the services they receive. In addition, the CSN 110 may use the state data 116 to determine whether to send messages to the MS 130, thereby waking the MSs 130 from their idle state. To assist the CSN 120 in determining whether to send messages to the MS 130, the accounting module 112 may comprise of a Message Processing Program (MPP) 300, which is discussed in detail below.

The third party network 102 may be any of various types of networks that exchange data with the MS 130 and/or the CSN 110. In embodiments, the third party network 102 may be a packet switched network (PSN), an intranet, the Internet, a local area network (LAN), a public switched telephone network (PSTN), or any other network known to persons of ordinary skill in the art. Alternatively, the third party network 102 may be another ASN 120 or another CSN 110. Persons of ordinary skill in the art are aware of other embodiments of the third party network 102.

Figure 2:
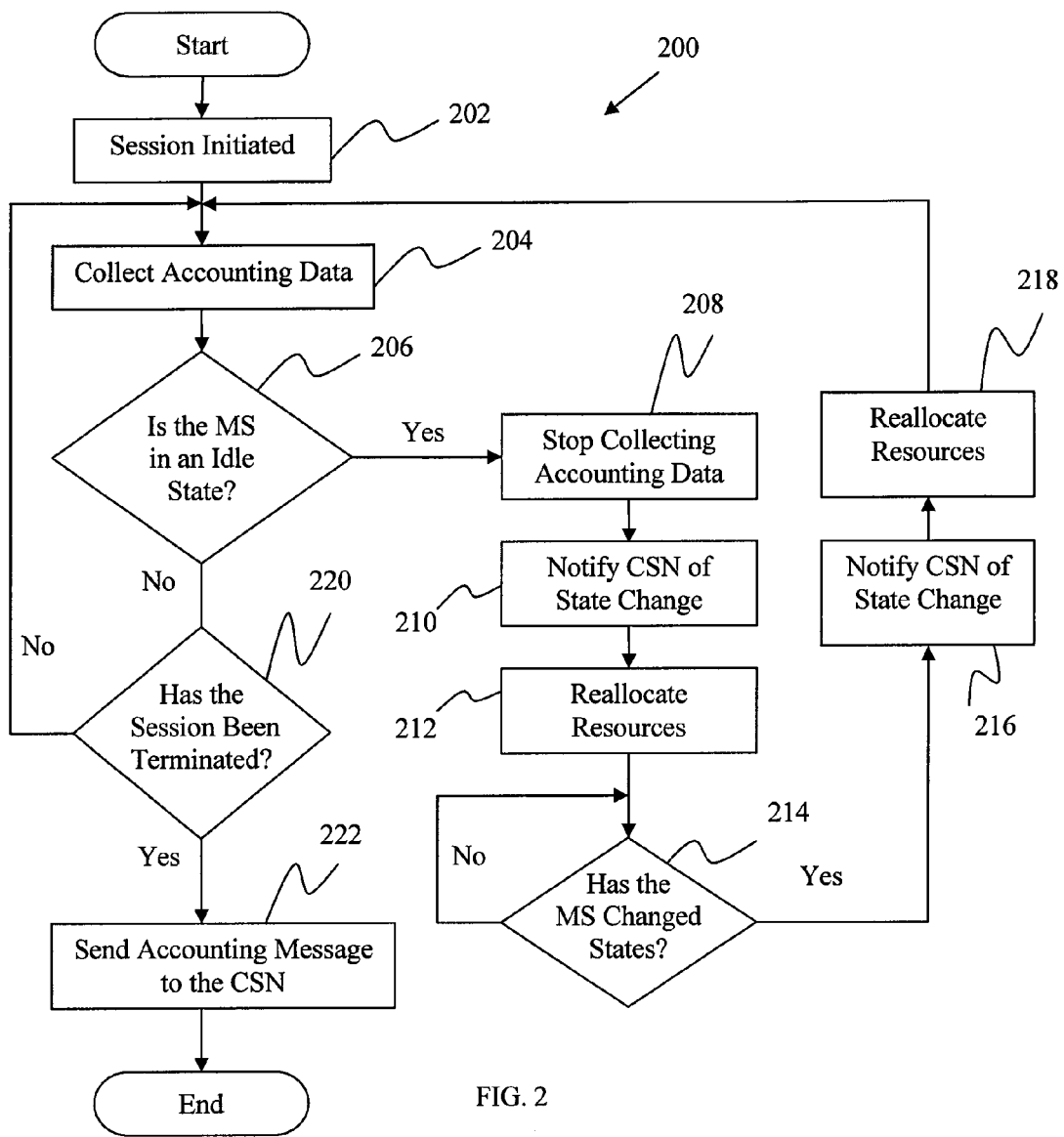
FIG. 2 is a flowchart of an embodiment of the state monitoring program.

FIG. 2 is a flowchart of one embodiment of a State Monitoring Program (SMP) 200. The SMP 200 may monitor the state of the MSs and communicate the state of the MSs to the CSN without including any accounting data within the state messages. The SMP 200 may also allocate resources away from idle MSs and allocate resources to active MSs as the MSs enter and exit the idle state. When a MS' session terminates, the SMP 200 sends a single instance of the accounting data to the CSN. The SMP 200 is generally implemented at the ASN, but may be implemented within any of the system components described herein.

The SMP 200 starts when an MS initiates a session at block 202. Generally, the MS initiates a session in the active state by performing an action. For example, a user may log onto the ASN, upload data, download data, place a telephone call, receive a telephone call, or perform some other action that indicates that the MS is in an active state. However, it is also contemplated that the user may initiate a session in the idle state. For example, the user may want to establish connectivity with the ASN to verify that the ASN's resources will be available in the future, but may not be ready to use the resources at the time of session initiation. Thus, the SMP 200 may begin when the MS initiates a session in the idle state as well. After the session is initiated, the SMP 200 proceeds to block 204.

At block 204, the SMP 200 collects the accounting data related to the MS' session. When collecting the accounting data, the SMP 200 may collect a wide variety of information related to the MS' session, such as the accounting data 124 discussed above. The SMP 200 may optionally collect state data related to the MS' state, if desired. The SMP 200 may collect the accounting data intermittently or continuously until the MS' session terminates. The SMP 200 then proceeds to block 206.

At block 206, the SMP 200 determines whether the MS is in an idle state. In one embodiment, the MS indicates when the MS changes states, for example by sending a message to the ASN that the MS has entered or exited an idle state. In another embodiment, the state of the MS can be detected by analyzing the MS' traffic patterns to determine whether the MS is in an idle state. For example, if the user is not using the MS but the MS is powered on, then the MS is in an idle state. Alternatively, if the MS is uploading or downloading data, then the MS is in an active state and is not in an idle state. However, data transfer may not be the sole indicator of the MS' state. For example, if the user is interacting with the MS without transferring any data to or from the ASN, e.g. when the user is typing an email but not checking his email, then the MS may be in an active state. Thus, as part of the determination whether the MS is in an idle state, the SMP 200 may analyze the MS to determine whether the user is actually using the MS. In addition, the SMP 200 may be configured with a timer that allows a predetermined amount of time to pass before the SMP 200 determines that the MS has entered an idle state. The timer is advantageous because the timer prevents the SMP 200 from repeatedly determining that the MS enters and exits the idle state in a short amount of time. Such repeated determinations may create a multiplicity of state messages and reduce the advantages obtained by eliminating the accounting data from the state message. If the MS is in an idle state, then the SMP 200 proceeds to block 208. If the MS is not in an idle state, then the SMP 200 proceeds to block 220.

When the SMP 200 determines that the MS is in an idle state, the SMP 200 may stop collecting accounting data as shown at block 208. As discussed previously, accounting data relates to any of a variety of different types of information associated with each MS. The SMP 200 may discontinue the collection of such accounting data when the MS enters the idle state. For example, a user on a notebook computer may decide to stop browsing the Internet and decide to work on some other application on their notebook computer. In such a case, the user may not be using any of the ASN's resources, and may have entered an idle state, and thus the SMP 200 may stop collecting the accounting data. After the accounting data has stopped being collected, the SMP 200 proceeds to block 210.

Figure 4:
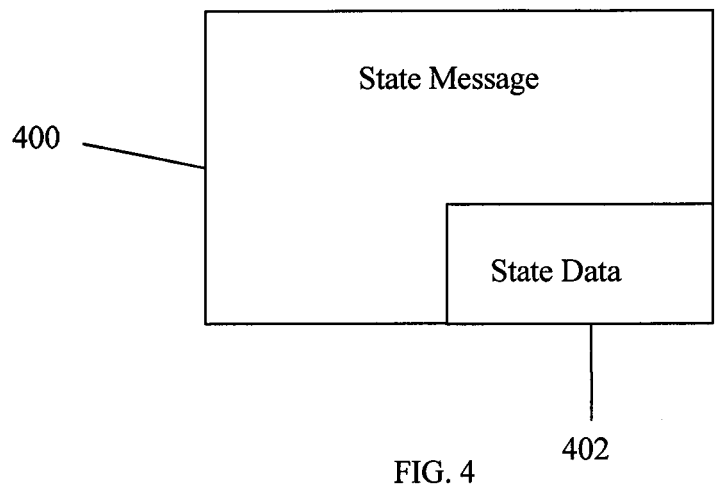
FIG. 4 is an embodiment of a state change notification message.

At block 210, the SMP 200 may notify the CSN of the state change. When the MS enters the idle state, the ASN may notify the CSN of the MS' state change, for example, by sending a state message to the CSN. An example of the state message is shown in FIG. 4 and discussed in detail below. The state message may be sent using an accounting protocol, such as RADIUS or DIAMETER, or may be sent using any other protocol known to persons of ordinary skill in the art. In a specific example, the state message is sent from the accounting module in the ASN directly to the accounting module in the CSN. Returning to FIG. 2, the SMP 200 then proceeds to block 212.

At block 212, the SMP 200 may allow a reallocation of resources. In an embodiment, the SMP 200 may allow the ASN to reallocate at least one resource away from the MS while the MS is in the idle state, thereby allowing the resources to be used by other MSs. Specifically, when the MS is in the idle state, the MS may surrender at least some of its resources, and the MS' surrendered resources may be temporarily allocated to the other MSs. For example, if the user closes their Internet browser on their notebook computer but is still connected to the ASN, the notebook computer may be in an idle state. In such a case, the ASN may reallocate the bandwidth previously used by the notebook computer to another MS, such as a PDA or another notebook computer, until the user's notebook computer exits the idle state. The SMP 200 then proceeds to block 214.

At block 214, the SMP 200 determines whether the MS has changed states. The determination of whether the MS has changed states is similar to the determination at block 206. However, at block 214 the SMP 200 is determining whether the MS has exited the idle state, rather than determining whether the MS has entered the idle state. If the SMP 200 determines that the MS has not changed states, the SMP 200 loops back to block 214. When the SMP 200 determines that the MS has changed states, the SMP 200 proceeds to block 216.

At block 216, the SMP 200 notifies the CSN of the MS' state change. The notification of the state change is similar to the notification at block 210. However, at block 216 the SMP 200 is notifying the CSN that the MS has exited the idle state, rather than notifying the CSN that the MS has entered the idle state. The SMP 200 then proceeds to block 218, where the SMP 200 may reallocate the resources back to the MS. The reallocation of resources is similar to the reallocation of resources at block 212. However, at block 218 the SMP 200 is reallocating resources back to the MS, rather than reallocating resources away from the MS. The SMP 200 then loops back to block 204.

At block 220, the SMP 200 determines whether the MS' session has been terminated. A variety of different indicators may be used to determine when the MS' session has been terminated. For example, the data transfer between the ASN and the MS may stop, an Internet browser or other application may be closed, the user may finish downloading data from the CSN or another network, or the MS or CSN may send a signal to the ASN that the session is to be terminated. If the MS' session terminates, then the SMP 200 proceeds to block 222. If the MS' session does not terminate, then the SMP 200 loops back to block 204.

At block 222, the MS' accounting data is sent to the CSN. As discussed earlier, the accounting data may include a wide variety of information related to the MS' session. When the MS' session is terminated, the accounting data from the MS' session is sent to the CSN, for example, in an accounting message. An example of an accounting message is illustrated in FIG. FIG. 5 and discussed in further detail below. The accounting data sent at block 222 is the only instance of the transmission of accounting data from the ASN to the CSN. This accounting data may include all or only some of the accounting data collected by the ASN. For example, after 30 minutes of browsing the Internet and downloading a 500-kilobyte (KB) picture file at one Megabit per second (Mbps), the user may log off of their Internet connection on their notebook computer, thereby terminating the session. When the session of the notebook computer is terminated, the accounting data sent to the CSN may indicate that the session was 30 minutes long and that 500 KB of data was transferred, but may not indicate the data transfer rate of one Mbps. After sending the accounting data at block 222, the SMP 200 ends.

Figure 3:
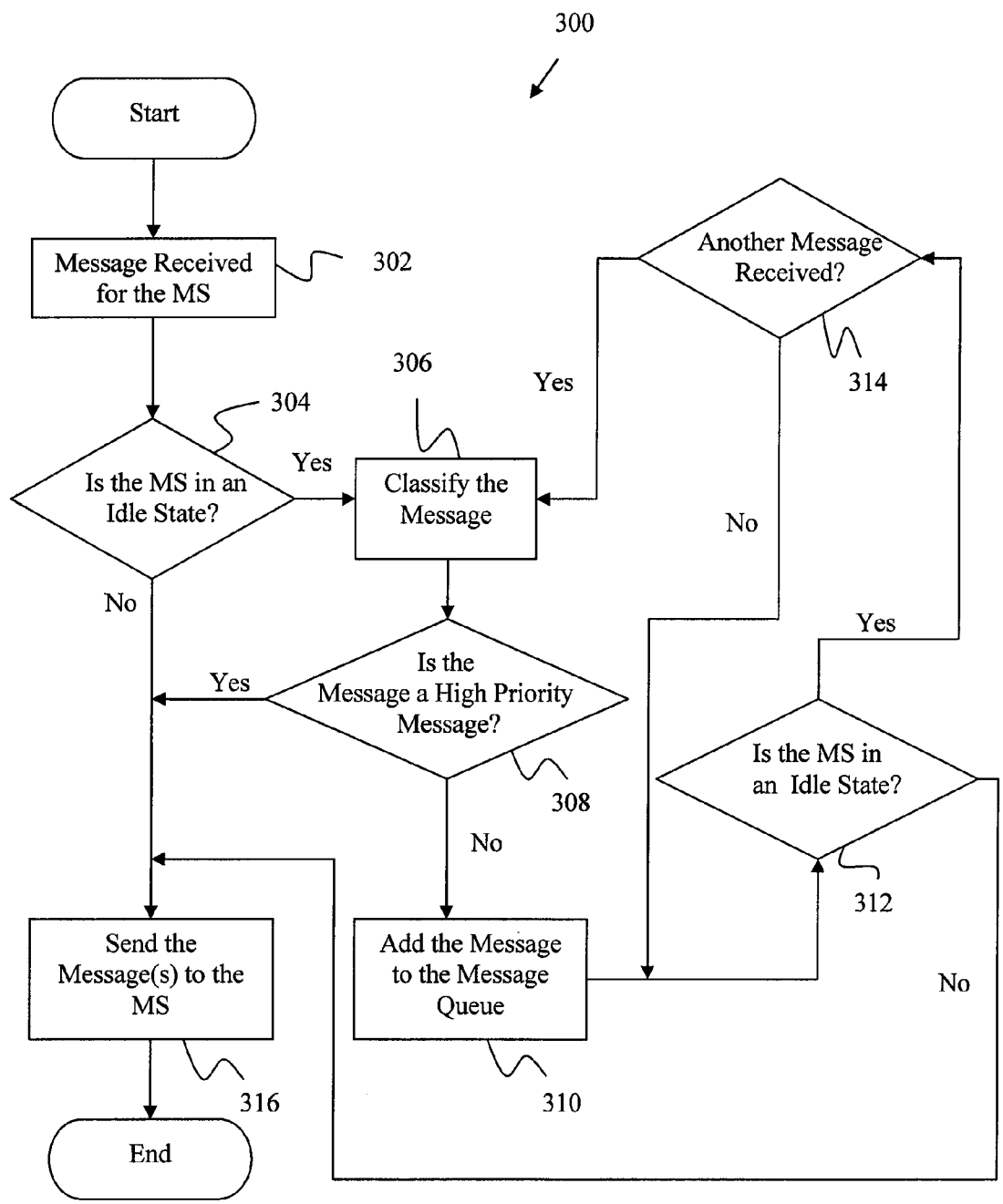
FIG. 3 is a flowchart of an embodiment of the message processing program.

FIG. 3 is a flowchart that illustrates one embodiment of the Message Processing Program (MPP) 300. The MPP 300 may monitor the state of the MSs, determine the priority of the MS's incoming messages, and determine whether to send the messages to the MS. The MPP 300 may be implemented in the CSN but may also be implemented in any other component or a combination of components described herein.

The MPP 300 starts when a message is received for the MS as shown at block 302. When messages are sent to a MS, they are generally routed to the CSN so that a determination can be made as to which specific ASN the MS is connected to and forward the message onto that ASN. In an embodiment, the message received for the MS is an instant message or an incoming telephone call for the user's cellular telephone. Alternatively, the message may be an email message on a user's PDA. The MPP 300 then proceeds to block 304.

At block 304, the MPP 300 determines whether the MS associated with the message is in an idle state. As discussed above, the MS may be in an active state or idle state. The CSN records the state of each MS, for example, using a state table that lists all of the MSs and the current state of each MS. When the ASN notifies the CSN of the MS' state changes, e.g. via a state message, then the CSN may update the state table such that the state table always has the current state of each MS. When the MPP 300 receives a message intended for a particular MS, then the MPP 300 may access the state table to determine whether the particular MS is in an idle state. Alternatively, the CSN may determine the MS' state using any other method, such as the methods discussed at blocks 206 and 214 of the SMP 200. If the MS associated with the message is in an idle state, then the MPP 300 proceeds to block 306. If the MS associated with the message is not in an active state, then the MPP 300 proceeds to block 316.

At block 306, the message may be classified into one of a plurality of different levels of importance. For example, messages may be classified as either high priority messages or low priority messages. Although the classification criteria may vary from CSN to CSN, in one embodiment instant messages and telephone calls may be classified as high priority messages, while email and advertisements may be classified as low priority messages. Alternatively, the classification can be based on one or more of the message's properties, such as the message's destination address, the message's source address, the user that produced the message, the user that will receive the message, the type of data within the message, the port that the message was received on, or any other message property known to persons of ordinary skill in the art. If desired, the CSN may be configured with a policy to help the CSN determine how to classify the messages. Such a policy may classify the message based on various combinations of the factors described herein. After classifying the message, the MPP 300 proceeds to block 308.

At block 308, the MPP 300 determines whether the message is a high priority message. When configuring the MPP 300, a threshold can be set such that high priority messages are sent to the MS, while low priority messages are held within a message queue until the MS exits the idle state. Setting the threshold may be an important consideration because sending a message to the MS while the MS is in the idle state may cause the MS to exit the idle state. Exiting the idle state may be undesirable if the user wants the MS to remain in an idle state or the message is unimportant. Thus, high priority messages may be defined as those messages that meet or exceed the threshold, while low priority messages are those that fail to meet the threshold. Where there are multiple priority levels, the threshold can be set between any two levels. For example, if there are five priority levels, the threshold can be set between the second and third highest priority levels such that messages that are classified in the two highest priority levels are classified as high priority messages. If the message is a high priority message, then the MPP 300 proceeds to block 316. However, if the message is not a priority message, then the MPP 300 proceeds to block 310.

At block 310, the message is added to the message queue. The message queue contains the messages that fail to exceed the message threshold described above. These messages may stay in the message queue until the MS changes into an active state. After adding the message to the message queue, the MPP 300 proceeds to block 312.

At block 312, the MPP 300 determines whether the MS is in an idle state. The determination at block 312 is similar to the determination at block 304. If the MS is in an idle state, then the MPP 300 proceeds to block 314. If the MS is not in an idle state, then the MPP 300 determines whether another message has been received at block 314. The reception of a message at block 314 is similar to the reception of the message at block 302. However, the message received at block 314 may not have the same priority as the message received at block 302, thus the MPP 300 may have to process the message received at block 314 differently than the message received at block 302. If another message has been received, the MPP 300 loops back to block 306. If another message has not been received, the MPP 300 loops back to block 312.

At block 316, any unsent messages are sent to the MS. The unsent messages may include the message received at block 302 and/or any messages residing in the message queue. If the MS is in an idle mode, then the MS will be awoken from the idle mode when the MS receives the message(s). After sending any unsent messages, the MPP 300 ends.

FIG. 4 illustrates one embodiment of a state message 400. The state message 400 is a message sent from an ASN to a CSN that indicates the state of at least one MS. The state message 400 contains state data 402, which may include at least some of the state data 126 illustrated in FIG. 1 and discussed above. Specifically, the state data 402 contains an indication of a particular MS and an indication of the current state of the MS, e.g. whether the MS is in the idle state or the active state. Alternatively, the state data 402 can contain an indication of the MS and an indication whether the MS has exited or entered a particular state, such as the idle state. During a session, an ASN may send one or a plurality of the state messages 400 to the CSN.

Figure 5:
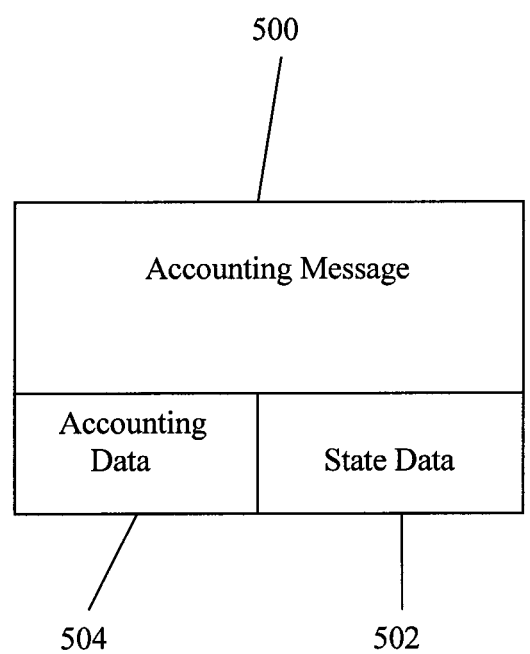
FIG. 5 is another embodiment of a state change notification message.

FIG. 5 illustrates one embodiment of an accounting message 500. The accounting message 500 is a message sent from an ASN to a CSN that contains the accounting data for at least one MS. The accounting message 500 contains accounting data 504, which includes at least some of the accounting data 124 illustrated in FIG. 1 and discussed above. Specifically, the accounting data 504 contains information related to the resources consumed by the MS during the course of the MS' session. The accounting message 500 may also contain state data 502, which may include at least some of the state data 126 illustrated in FIG. 1 and discussed above. Unlike the state message illustrated in FIG. 4, each ASN sends only one accounting message 500 to the CSN per MS session.

Figure 6:
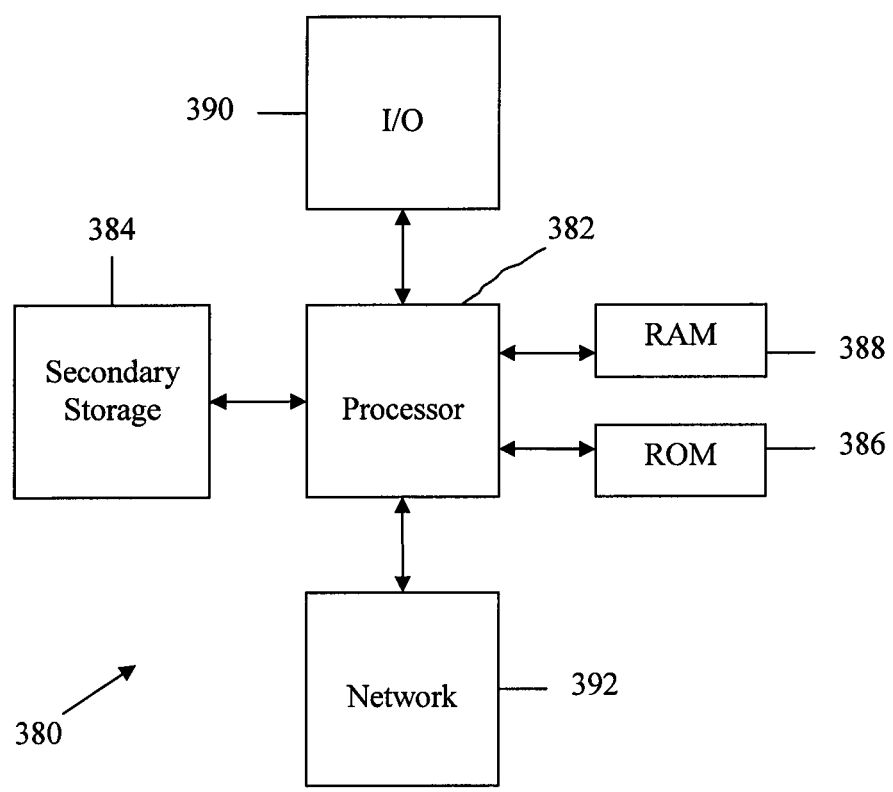
FIG. 6 illustrates an exemplary general-purpose computer system suitable for implementing the several embodiments of the disclosure.

The network described above may be implemented on any general-purpose network component, such as a computer, node, router, switch, or bridge, with sufficient processing power, memory resources, and network throughput capability to handle the necessary workload placed upon it. FIG. 6 illustrates a typical, general-purpose network component suitable for implementing one or more embodiments of a node disclosed herein. The network component 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs that are loaded into RAM 388 when such programs are selected for execution. The ROM 386 is used to store instructions and perhaps data that are read during program execution. ROM 386 is a non-volatile memory device that typically has a small memory capacity relative to the larger memory capacity of secondary storage. The RAM 388 is used to store volatile data and perhaps to store instructions. Access to both ROM 386 and RAM 388 is typically faster than to secondary storage 384.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component at an access service network comprising a processor configured to implement a method comprising:
   detecting a state of a mobile station during a session, the state of the mobile station comprising an idle state and an in-use state;
   sending a state message to a connection service network using an accounting protocol, wherein the state message comprises a state data indicating the state of the mobile station, wherein the state message is sent using the accounting protocol but does not contain any accounting data, wherein a resource is allocated away from the mobile station without terminating the session while the mobile station is in the idle state, and wherein a resource is reallocated to the mobile station after the mobile station exits the idle state;
   collecting accounting data associated with the mobile station only when the mobile station is not in the idle state during the session; and
   sending an accounting message with the accounting data to the connection service network after the session is terminated, wherein the accounting data for the session is sent in a single message for each session.

2. The component of claim 1 wherein the state message consists essentially of the state data.

3. The component of claim 1 wherein detecting the state of the mobile station comprises:
   determining whether the mobile station has entered the idle state; and
   sending the state message to the connection service network when the mobile station enters the idle state.

4. The component of claim 3 wherein the method further comprises:
   discontinuing the collection of accounting data when the mobile station enters the idle state.

5. The component of claim 1 wherein the accounting protocol is Radius or Diameter.

6. The component of claim 1 wherein detecting the state of the mobile station comprises:
   determining whether the mobile station has exited the idle state; and
   sending the state message to the connection service network when the mobile station exits the idle state.

7. The component of claim 1 wherein the method further comprises:
   initiating the session for the mobile station; and
   determining whether the session has been terminated.

8. The component of claim 1 wherein the accounting message comprises an amount of uploaded data, an amount of downloaded data, and a data transfer rate.

9. The component of claim 1 wherein the accounting message comprises the accounting data and the state data.

10. The component of claim 1, wherein the resource is allocated away from the mobile station without terminating the session by the access service network.

11. The component of claim 10, wherein the resource is reallocated to the mobile station by the access service network.

12. An apparatus comprising:
   a first communications component configured to allow a network to communicate with a mobile station thereby configuring the apparatus to be used in an access service network;
   a second communications component configured to communicate with a connection service network; and
   an accounting module comprising an accounting data associated with the mobile station and a state data associated with the mobile station, wherein the accounting module is configured to collect the accounting data associated with the mobile station during a session, and wherein the second communications component independently communicates with the state data and the accounting data to the connection service network, wherein the second communications component is configured to send the state data associated with the mobile station using an accounting protocol without sending the accounting data when the mobile station changes a state, wherein the second communications component is configured to send an accounting message with the accounting data to the connection service network after the session is terminated, wherein the apparatus is configured to allow the access service network to allocate a resource away from the mobile station without terminating the session while the mobile station is in an idle state, and wherein the apparatus is configured to allow the access service network to reallocate a resource to the mobile station after the mobile station exits the idle state, and wherein the second communications component is configured to send an accounting message with the accounting data only once for each session.

13. The apparatus of claim 12 wherein the connection service network comprises an accounting module that determines whether to send or store messages for the mobile station using the state data.

14. The apparatus of claim 13 wherein an accounting protocol is used to send the mobile station state data without sending the accounting data.

15. The apparatus of claim 12, wherein the accounting module is configured to collect the accounting data associated with the mobile station only when the mobile station is not in the idle state during the session.

16. An access service network comprising a processor configured to implement a method comprising:
   allocating a resource to a mobile station;
   detecting a state of the mobile station during a session, the state of the mobile station comprising an idle state and an in-use state;
   sending a state message to a connection service network using an accounting protocol, wherein the state message comprises a state data indicating the state of the mobile station, wherein the state message is sent using the accounting protocol but does not contain any accounting data;
   at the processor, deciding to deallocate the resource away from the mobile station when the mobile station is in the idle state during the session;
   deallocating the resource away from the mobile station without terminating the session;
   reallocating a resource to the mobile station after the mobile station exits the idle state; and
   sending an accounting message with an accounting data associated with the mobile station to the connection service network after the session is terminated, wherein the accounting data is sent only once for each session.

17. The access service network of claim 16, wherein the processor is further configured to collect the accounting data associated with the mobile station only when the mobile station is not in the idle state during the session with the mobile station.

18. A network component comprising a processor configured to implement a method comprising:
   after a session with a mobile station is initiated, beginning to collect an accounting data associated with the mobile station;
   determining whether the mobile station has entered an idle state;
   continuing to collect the accounting data associated with the mobile station when the mobile station is not in the idle state;
   determining whether the session with the mobile station has terminated if the mobile station is not in an idle state;
   sending an accounting message comprising the collected accounting data to a connection service network after the session with the mobile station has terminated, wherein the accounting data is sent only once for each session with the mobile station;
   reallocating resources away from the mobile station without terminating the session if the mobile station is in the idle state;
   stopping to collect the accounting data associated with the mobile station if the mobile station is in the idle state;
   sending a first state message to the connection service network using an accounting protocol, wherein the first state message comprises a first state data indicating the state of the mobile station, and wherein the first state message being sent using the accounting protocol does not contain any accounting data; and
   allocating resources to the mobile station if the mobile station has exited the idle state.

19. The network component of claim 18, wherein the method further comprises:
   determining whether the mobile station has exited the idle state; and
   sending a second state message to the connection service network using the accounting protocol if the mobile station has exited the idle state, wherein the second state message comprises a second state data indicating the state of the mobile station, and wherein the second state message being sent using the accounting protocol does not contain any accounting data.

20. The network component of claim 18, wherein the method further comprises:
   until the session with the mobile station terminates, repeating the steps of: determining whether the mobile station has entered an idle state, continuing to collect the accounting data, and determining whether the session with the mobile station has terminated.

* * * * *